United States Patent
Pfleger

(10) Patent No.: US 12,498,038 B2
(45) Date of Patent: Dec. 16, 2025

(54) METHOD AND DEVICE FOR CHECKING THE POSITION OF THE GEARSHIFT LEVER OF A GEARBOX OF A VEHICLE

(71) Applicant: Bayerische Motoren Werke Aktiengesellschaft, Munich (DE)

(72) Inventor: Franz Pfleger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 318 days.

(21) Appl. No.: 18/017,782

(22) PCT Filed: Aug. 10, 2021

(86) PCT No.: PCT/EP2021/072209
§ 371 (c)(1),
(2) Date: Jan. 24, 2023

(87) PCT Pub. No.: WO2022/053242
PCT Pub. Date: Mar. 17, 2022

(65) Prior Publication Data
US 2023/0341046 A1    Oct. 26, 2023

(30) Foreign Application Priority Data
Sep. 8, 2020 (DE) .................. 10 2020 123 343.4

(51) Int. Cl.
*F16H 59/04* (2006.01)
*F16H 59/02* (2006.01)

(52) U.S. Cl.
CPC ... *F16H 59/044* (2013.01); *F16H 2059/0234* (2013.01); *F16H 2342/02* (2013.01)

(58) Field of Classification Search
CPC ...... F16H 59/044; F16H 59/105; F16H 59/68; F16H 2059/0234; F16H 2059/0295; F16H 2342/02
See application file for complete search history.

(56) References Cited

U.S. PATENT DOCUMENTS

2006/0293823 A1   12/2006   Miyamaru et al.
2013/0133457 A1*   5/2013   Sakamoto ............. F16H 61/688
                                                                                             74/473.12
(Continued)

FOREIGN PATENT DOCUMENTS

CN      101078435 A    11/2007
CN      101994824 A     3/2011
(Continued)

OTHER PUBLICATIONS

International Search Report (PCT/ISA/210) issued in PCT Application No. PCT/EP2021/072209 dated Nov. 3, 2021 with English translation (six (6) pages).
(Continued)

*Primary Examiner* — Timothy Hannon
(74) *Attorney, Agent, or Firm* — Crowell & Moring LLP

(57) ABSTRACT

A device and method check the position of a gearshift lever for a gearbox of a vehicle. The device is designed to determine first sensor data relating to the length of the selector travel of the selector shaft of the gearbox during at least one upshifting process which is brought about by the driver of the vehicle deflecting the gearshift lever in a first direction. The device is also designed to determine second sensor data relating to the length of the selector travel of the selector shaft of the gearbox during at least one downshifting process brought about by the driver of the vehicle deflecting the gearshift lever in a second direction. The device is designed to check the position of the gearshift lever on the basis of the first sensor data and on the basis of the second sensor data.

21 Claims, 2 Drawing Sheets

(56) References Cited

U.S. PATENT DOCUMENTS

| | | |
|---|---|---|
| 2015/0152964 A1 | 6/2015 | Tanaka |
| 2017/0067555 A1 | 3/2017 | Seimann |
| 2020/0151968 A1* | 5/2020 | Suzuki .................. B62K 23/06 |

FOREIGN PATENT DOCUMENTS

| | | |
|---|---|---|
| CN | 104670415 A | 6/2015 |
| CN | 105443744 A | 3/2016 |
| DE | 197 31 842 A1 | 1/1998 |
| DE | 103 50 937 A1 | 5/2004 |
| DE | 10 2006 026 951 A1 | 12/2006 |
| DE | 10 2010 033 244 A1 | 2/2011 |
| DE | 10 2011 076 388 A1 | 11/2012 |
| DE | 10 2011 086 243 A1 | 5/2013 |
| DE | 10 2015 114 338 A1 | 3/2017 |
| EP | 2 674 354 A2 | 12/2013 |
| GB | 2472570 A | 2/2011 |

OTHER PUBLICATIONS

German-language Written Opinion (PCT/ISA/237) issued in PCT Application No. PCT/EP2021/072209 dated Nov. 3, 2021 (five (5) pages).

German-language Search Report issued in German Application No. 10 2020 123 343.4 dated Apr. 20, 2021 with partial English translation (10 pages).

Chinese-language Office Action issued in Chinese Application No. 202180049222.0 dated Jul. 29, 2025, with English translation (18 pages).

\* cited by examiner

METHOD AND DEVICE FOR CHECKING THE POSITION OF THE GEARSHIFT LEVER OF A GEARBOX OF A VEHICLE

BACKGROUND AND SUMMARY

The invention relates to a method and corresponding apparatus for checking and, if appropriate, for adapting, the position of the gearshift lever of a gearshift transmission of a vehicle, in particular a motorcycle.

A vehicle, in particular a single-track vehicle, such as for example a motorcycle, may have a shift lever which is configured to be actuated by a foot of the driver of the vehicle in order to change the gear of a transmission of the vehicle. The shift lever may in this case be deflected by the foot in a first direction (for example upward), in order to increase the set gear, and/or the shift lever may be deflected by the foot in an opposite second direction (for example downward), in order to decrease the set gear.

Upshifting or downshifting via the shift lever of a vehicle can be perceived differently in terms of comfort by different drivers. Upshifting or downshifting via the shift lever can furthermore have a different level of reliability for different drivers.

The present document is concerned with the technical problem of allowing in each case a high level of comfort and a high level of reliability of upshift and downshift processes via a foot shift lever of the vehicle for different drivers of a vehicle.

The object is achieved in each case by the individual independent claims. Advantageous embodiments are described inter alia in the dependent claims. It is pointed out that additional features of a patent claim that is dependent on an independent patent claim may, without the features of the independent patent claim or only in combination with a subset of the features of the independent patent claim, form a separate invention which is independent of the combination of all the features of the independent patent claim and which may be made the subject of an independent claim, of a divisional application or of a subsequent application. This applies equally to technical teachings given in the description, which can form an invention which is independent of the features of the independent patent claims.

According to one aspect, an apparatus for checking the position of the shift lever for a (shift) transmission of a vehicle, in particular a motorcycle, is described. The shift lever may be configured to be actuated, in particular deflected in a first direction (for example upward) or in an (opposite) second direction (for example downward), by a foot of the driver of the vehicle.

The shift lever may furthermore be configured to convert a deflection of the shift lever in the first direction into a rotation of the shift shaft of the transmission in a first direction (for example into a counterclockwise rotation), and/or to convert a deflection of the shift lever in the opposite second direction into a rotation of the shift shaft of the transmission in an opposite second direction (for example into a clockwise rotation), in particular via a linkage.

The position of the shift lever, in particular the position of the bolt via which the driver of the vehicle can act on the switch lever, can be settable possibly via a setting screw and/or automatically by means of an actuator (for example by means of an electric motor). In this case, the neutral position of the shift lever, in particular of the bolt, can be displaced in the first direction or in the second direction. Through displacement of the neutral position of the shift lever in the first direction, it is possible for example for the length of the shift travel of the shift shaft of the transmission effected by the driver to be shortened for an upshift process and to be lengthened for a downshift process. Correspondingly, through displacement of the neutral position of the shift lever in the second direction, it is typically possible for the length of the shift travel of the shift shaft of the transmission effected by the driver to be lengthened for an upshift process and to be shortened for a downshift process.

The apparatus is configured to ascertain first sensor data in relation to the length of the shift travel of the shift shaft of the transmission during at least one upshift process effected by deflection of the shift lever by the driver of the vehicle in the first direction. In particular, the apparatus may be configured to ascertain first sensor data for a multiplicity of upshift processes.

The apparatus is furthermore configured to ascertain second sensor data in relation to the length of the shift travel of the shift shaft of the transmission during at least one downshift process effected by deflection of the shift lever by the driver in the second direction. In particular, the apparatus may be configured to ascertain second sensor data for a multiplicity of downshift processes.

The shift shaft may have a magnet which is configured to rotate together with the shift shaft about the axis of rotation of the shift shaft. The apparatus may be configured to ascertain the first sensor data and the second sensor data by means of a sensor, in particular by means of a Hall sensor, which is configured to detect sensor data in relation to the magnetic field generated by the magnet, in particular in relation to the field strength of the magnetic field.

The apparatus is furthermore configured to check the position of the shift lever, in particular the suitability of the position of the shift lever for the driver, on the basis of the first sensor data and on the basis of the second sensor data. In particular, the apparatus may be configured to ascertain, on the basis of the first sensor data and on the basis of the second sensor data, a statistical evaluation, in particular a frequency distribution, of the length of the shift travel of the shift shaft of the transmission for the multiplicity of upshift processes and for the multiplicity of downshift processes. The position of the shift lever, in particular the suitability of the position of the shift lever, can then be checked on the basis of the statistical evaluation, in particular on the basis of the frequency distribution.

The apparatus thus makes it possible to precisely check, for a specific driver of the vehicle, whether the position of the shift lever is suitable for the driver, in particular whether the position of the shift lever matches the foot and/or the shoe of the driver. In this way, the level of comfort and the level of reliability of shift processes can be increased for the specific driver of the vehicle. In particular, a specific position of the shift lever can in this way be ascertained and possibly set for the respective driver of the vehicle.

The apparatus may be configured to instigate adaptation of the position of the shift lever, according to the first sensor data and the second sensor data. In particular, adaptation of the position of the shift lever may be instigated if it is identified that the position of the shift lever is not suitable for the driver of the vehicle and/or does not match the driver.

The apparatus may furthermore be configured to ascertain, on the basis of the first sensor data and on the basis of the second sensor data, a target position of the shift lever (which is suitable for the driver of the vehicle). The apparatus may furthermore be configured to instigate adaptation of the position of the shift lever according to the ascertained target position.

The instigation of the change to the position of the shift lever and/or the setting of the shift lever to the target position may be caused for example: through output of a piece of information to the driver of the vehicle (for example via a user interface of the vehicle); and/or through entry of a piece of information into an error memory of the vehicle (in order to instigate adaptation of the position of the shift lever by the maintenance service for the vehicle); and/or through activation of an actuator (for example an electric motor) of the vehicle, which is configured to automatically change the position of the shift lever.

The (possibly automatic) adaptation of the position of the shift lever makes it possible for the level of comfort and the level of reliability of shift processes effected by a specific driver of the vehicle to be increased.

The apparatus may be configured to ascertain, on the basis of the first sensor data, a minimum, an average and/or a maximum (first) length of the shift travel for the multiplicity of upshift processes. Correspondingly, the apparatus may be configured to ascertain, on the basis of the second sensor data, a minimum, an average and/or a maximum (second) length of the shift travel for the multiplicity of downshift processes. In this case, the magnitude of the lengths of the respective shift travels may be ascertained in each case.

The minimum, average and/or maximum first length of the shift travel (for the upshift processes) may then be compared with the minimum, average and/or maximum second length of the shift travel (for the downshift processes) in order to check the position of the shift lever, in particular the suitability of the position of the shift lever for the driver. In this case, a difference between the first length and the corresponding second length that is above a predefined difference threshold value may be an indication that the position of the shift lever is not suitable for the driver of the vehicle. Comparison of the length of the shift travels during upshift processes and the length of the shift travels during downshift processes allows the position of the shift lever to be checked particularly precisely.

The apparatus may be configured to compare the minimum, average and/or maximum first length of the shift travel with a length threshold value. In this case, the length threshold value may depend on the minimum length of the shift travel of the shift shaft of the transmission (or correspond to the minimum length) that is a minimum requirement for a successful shift process. Correspondingly, the apparatus may be configured to compare the minimum, average and/or maximum second length of the shift travel with the length threshold value. The position of the shift lever can then be checked particularly precisely on the basis of the comparisons. In particular, through the comparisons with the length threshold value, precise identification of whether the setting of the shift lever allows the driver to carry out reliable and/or comfortable upshift or downshift processes is possible.

The apparatus may be configured to ascertain the target position for effecting, for a multiplicity of future shift processes, a greater degree of symmetry of a frequency distribution of the lengths of the switching travels that is ascertained for the multiplicity of future shift processes than the frequency distribution ascertained on the basis of the first sensor data and second sensor data. For this purpose, the neutral position of the shift lever can be displaced in the first direction if the frequency distribution indicates that the first lengths of the shift travels for upshift processes are larger than the second lengths of the shift travels for downshift processes. Alternatively, the neutral position of the shift lever can be displaced in the second direction if the frequency distribution indicates that the first lengths of the shift travels for upshift processes are smaller than the second lengths of the shift travels for downshift processes.

The adaptation of the position of shift lever can thus be geared toward effecting a frequency distribution of the lengths of the shift travels for upshift processes and for downshift processes that is as symmetrical as possible.

Alternatively or additionally, the apparatus may be configured to ascertain the target position for effecting, for a multiplicity of future shift processes, a smaller difference between the average second length and the average first length ascertained for the multiplicity of future shift processes than between the average second length and the average first length ascertained on the basis of the first sensor data and the second sensor data. Increased symmetry of the frequency distribution of the lengths of the shift travels can thus be effected for example by bringing into line the average length of the shift travels for upshift processes and for downshift processes. This can be effected by displacement of the neutral position of the shift lever in the first direction or in the second direction (as explained above).

Bringing into line the lengths of the shift travels for upshift processes and for downshift processes allows the level of comfort and the level of reliability of shift processes to be increased for a specific driver of the vehicle particularly precisely.

According to a further aspect, a (road-going) motor vehicle (in particular a motorcycle) that comprises the apparatus described in the present document is described.

According to a further aspect, a method for checking the position of a shift lever for a transmission of a vehicle is described. The method comprises ascertaining first sensor data in relation to the length of the shift travel of the shift shaft of the transmission during at least one upshift process effected by deflection of the shift lever by the driver of the vehicle in a first direction. The method furthermore comprises ascertaining second sensor data in relation to the length of the shift travel of the shift shaft of the transmission during at least one downshift process effected by deflection of the shift lever by the driver in a second direction. The method furthermore comprises checking the position of the shift lever, in particular checking the suitability of the position of the shift lever for the driver, on the basis of the first sensor data and on the basis of the second sensor data.

According to a further aspect, a software (SW) program is described. The SW program may be configured to be executed on a processor (for example on a control unit of a vehicle) and to consequently carry out the method described in the present document.

According to a further aspect, a memory medium is described. The memory medium may comprise an SW program which is configured to be executed on a processor and to consequently carry out the method described in the present document.

It should be noted that the methods, apparatuses and systems described in the present document may be used both on their own and in combination with other methods, apparatuses and systems described in the present document. Furthermore, any aspects of the methods, apparatuses and systems described in the present document may be combined with one another in a variety of ways. In particular, the features of the claims may be combined with one another in a variety of ways.

The invention will be described in more detail below on the basis of exemplary embodiments.

BRIEF DESCRIPTIONS OF THE DRAWINGS

DETAILED DESCRIPTIONS OF THE DRAWINGS

Figure 1:
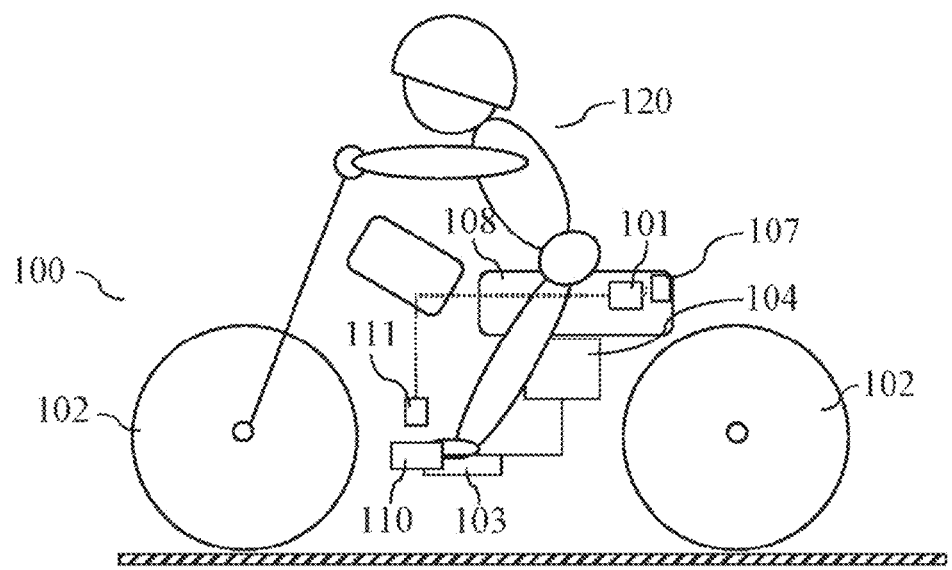
FIG. 1 shows an exemplary single-track vehicle in a side view.

As set out in the introduction, the present document is concerned with comfortable and reliable carrying-out of shift processes by means of a foot shift lever. In this connection, FIG. 1 shows an exemplary (single-track) vehicle 100 having (exactly) one front and (exactly) one rear wheel 102. The driver 120 of the vehicle 100 is sitting on a seat 108 of the vehicle 100. A foot of the driver 120 can be set down on a foot support 103 such that the driver 120 can actuate a shift lever 110 with the tip of the foot that is set down on the foot support 103, in order to change, in particular to upshift or to downshift, the set gear of the transmission 104 of the vehicle 100.

Figure 2A:
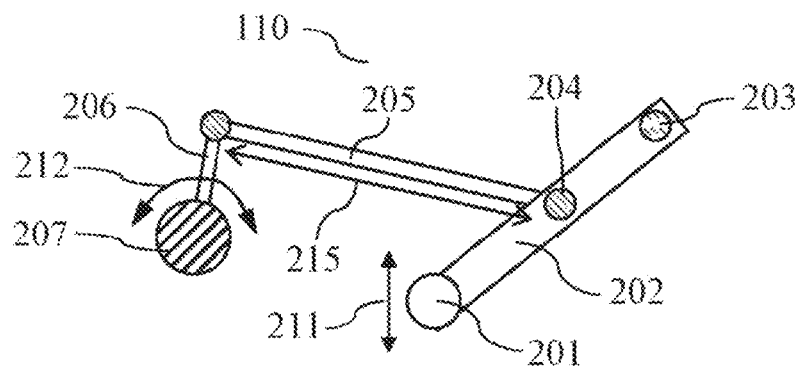
FIG. 2a shows an exemplary shift lever in a side view.

FIG. 2a shows further details of an exemplary shift lever 110. The shift lever 110 comprises a first lever 202, which can be rotated about a first axis of rotation 203. Arranged at that end of the first lever 202 which faces away from the first axis of rotation 203 is a foot bolt or a pin 201, which can be actuated by the foot of the driver 120 in order for the first lever 202 to be deflected upward or downward (illustrated by the double arrow 211).

The first lever 202 acts via an intermediate lever 205 and a shaft lever 206 on the shift shaft 207 of the transmission 104. For this purpose, the intermediate lever 205 is attached to the first lever 202 at an attachment point 204 between the first axis of rotation 203 and the foot bolt 201. If the first lever 202 is deflected upward, this results in a rotation or in a shift travel of the shift shaft 207 in a first direction of rotation. If, on the other hand, the first lever 202 is deflected downward, this results in a rotation or in a shift travel of the shift shaft 207 in an (opposite) second direction of rotation (illustrated by the double arrow 212). The extent of the rotation or the length of the shift travel of the shift shaft 207 depends in this case on the length 215 of the intermediate lever 205. Alternatively or additionally, the neutral position of the bolt 201 depends on the length 215 of the intermediate lever 205.

Figure 2B:
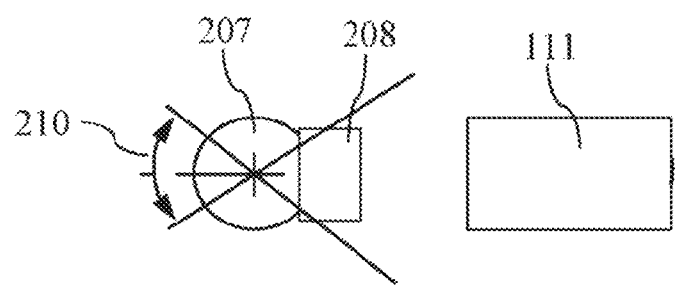
FIG. 2b shows a shift shaft with a shift-travel sensor.

The vehicle 100 may comprise a shift-travel sensor 111, which is configured to detect sensor data in relation to the length of the shift travel of the shift shaft 207 during a shift process. For this purpose, as illustrated in FIG. 2b, a magnet 208 may be arranged on the shift shaft 207 (in particular be connected fixedly to the shift shaft 207), which magnet is rotated or moved together with the shift shaft 207. The shift-travel sensor 111 may comprise a Hall sensor, which is configured to detect the field strength of the magnetic field generated by the magnet 208. It is then possible, on the basis of the profile of the field strength, for the shift travel 210 covered by the shift shaft 207 to be inferred. The shift travel 210 corresponds in this case to a certain angle range of the rotation of the shift shaft 207.

During the operation of the vehicle 100, it is possible, for a multiplicity of shift processes, for a corresponding multiplicity of values of the length of the in each case effected shift travel 210 to be ascertained. In this case, the values of the length of the shift travels 210 can be ascertained for upshift processes and for downshift processes. Based on the ascertained length values, it is then possible for a statistical evaluation of the shift-travel lengths to be carried out, as illustrated by way of example in FIG. 3.

Figure 3:
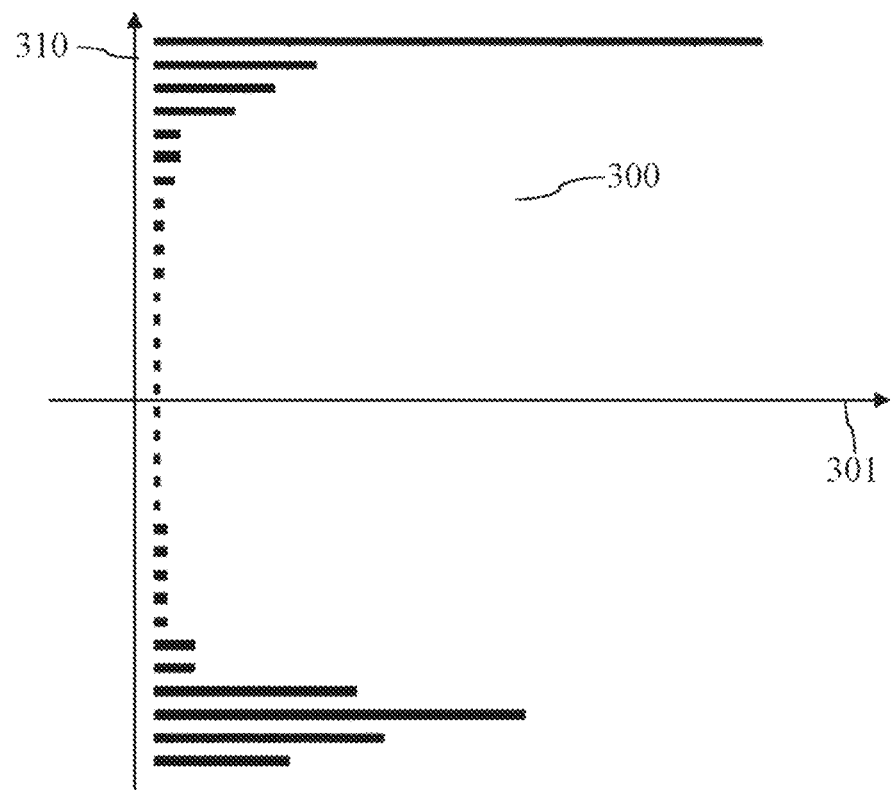
FIG. 3 shows exemplary statistical data in relation to the shift travels for a multiplicity of shift processes.

FIG. 3 shows the frequency 301 of the shift-travel lengths 310 detected for a multiplicity of shift processes. In this case, a positive shift-travel length 310 may correspond for example to an upshift process, while a negative shift-travel length 310 may correspond to a downshift process. It is thus possible for a statistical frequency distribution 300 of the shift-travel lengths 310 for a multiplicity of shift processes to be ascertained. It can then be checked, on the basis of the frequency distribution 300 of the shift-travel lengths 310, whether the shift lever 110 of the vehicle 100 is correctly set for the driver to allow comfortable and/or reliable shift processes for the driver.

As can be seen from FIG. 3, the frequency distribution 300 of the shift-travel lengths 310 in the illustrated example is asymmetrical. In particular, the average of the shift-travel lengths 310 effected during upshift processes is larger than the average of the shift-travel lengths 310 during downshift processes. Since, for a reliable shift process, it is typically required that the shift-travel length 310 effected during the shift process reaches or exceeds (in terms of magnitude) a certain minimum length (that is to say a length threshold value), in the examples illustrated in FIG. 3, upshift processes have a relatively high level of reliability, while downshift processes have a relatively low level of reliability. Furthermore, downshift processes presumably have a relatively low level of comfort since it appears to be difficult for the driver of the vehicle 100 to effect the required shift-travel length 310 for a downshift process.

An evaluation apparatus 101 of the vehicle 100 may be configured to ascertain the shift-travel length 310 effected for a shift process (on the basis of the sensor data of the shift-travel sensor 111) and to store said shift-travel length in a memory unit 107. The apparatus 101 may furthermore be configured to check, on the basis of the shift-travel lengths 310 for a multiplicity of shift processes, in particular on the basis of a frequency distribution 300 of the shift-travel lengths 310, whether or not there is an incorrect or an unfavorable position of the shift lever 110 or whether or not the position of the shift lever 110 should be adapted for the driver of the vehicle 100. The apparatus 101 may furthermore be configured to instigate carrying-out of a change to the position of the shift lever 110, according to requirement. This may be effected for example through output of a piece of information to the driver of the vehicle 100 and/or to a maintenance service for the vehicle 100.

The position of the shift lever 110, in particular the length 215 of the intermediate lever 205, can then be adapted so as to effect the possibility of upshift processes and downshift processes being carried out by the driver in a comfortable and reliable manner. For example, the position of the shift lever 110 can be changed in such a way that a symmetrical frequency distribution 300 for the shift-travel lengths 310 for upshift processes and downshift processes is obtained.

The position, in particular the neutral position, of the shift lever 110 can be set manually (for example by way of a setting screw). Optionally, the vehicle 100 may have an actuator (not illustrated), in particular an electric motor, which is configured to automatically change the position, in particular the neutral position, of the shift lever 110. The position of the shift lever 110 can then be adapted automatically according to the ascertained shift-travel lengths 310.

The present document thus describes a foot shift lever 110 for a motorcycle transmission 104 that allows sequential shifting of the transmission 104 by foot by the driver 120 of a motorcycle 100. The lever 110 can be pushed by a foot of the driver in an upward direction for an upshift and in a downward direction for a downshift. The movement of the lever 110 is in this case converted via a linkage 205, 206 into a rotational movement of the shift shaft 207 of the transmission 104.

The foot shift lever 110 of a motorcycle 100 typically has a standard position, that is to say a standard neutral position, which is not adapted to the foot geometry or the shoe of the respective driver 120. If the foot of the driver or the shoe differs to too great an extent in relation to the normal position associated with the standard position of the foot shift lever 110, then the shift process can be negatively influenced during upshifting or downshifting.

For the function of a shift assistant (SASS), there can be attached to the transmission shift shaft 207 a sensor 111 which measures the rotational movement of the shift shaft 207 relative to the housing of the transmission 104 or of the engine. The sensor 111 can then be used to measure the shift travels 210, in particular the shift-travel length 310. If the driver 120 pulls or pushes on the shift lever 110, then the shift shaft 207 is rotated in a first direction of rotation or in a second direction of rotation and the sensor 111 measures the rotational angle (and thus the shift-travel length 310) at the shift shaft 207. Ascertainment of the shift travel 210 as far as the respective end position of the shift shaft 207 during the respective shift process is thus possible both for an upshift and for a downshift. If the end positions of the shift processes in one direction differ in comparison with the end positions of the shift processes in the other direction, it can then be assumed that the position of the shift lever 110 is not optimal for the driver. The frequency of incorrect shifts can then increase. Correction of the position of the shift lever 110 can be made possible for example via an adjustment screw.

The sensor data in relation to the shift-travel length 310 may be stored and evaluated for a multiplicity of shift processes. Based on this information, an optimized target position of the shift lever 110 can then, for the driver 120 of the vehicle 100, be ascertained and suggested and/or possibly be automatically set.

Figure 4:
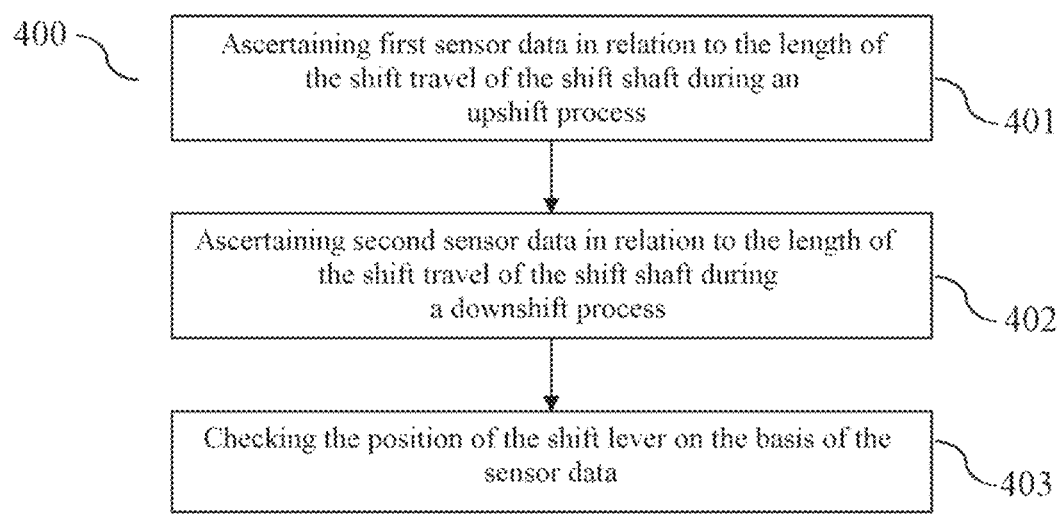
FIG. 4 is a flow diagram of an exemplary method for checking the position of a foot shift lever.

FIG. 4 shows a flow diagram of an exemplary (possibly computer-implemented) method 400 for checking the position of a shift lever 110, in particular a foot shift lever, for a transmission 104 of a vehicle 100, in particular a motorcycle. The method 400 comprises ascertaining 401 first sensor data in relation to the length 310 of the shift travel 210 of the shift shaft 207 of the transmission 104 during at least one upshift process effected by deflection of the shift lever 110 by the driver of the vehicle 100 in a first direction (for example by upward deflection). In particular, first sensor data can be ascertained for a multiplicity of upshift processes which have in each case been effected by the driver by deflection of the shift lever 110 in the first direction. Ascertainment of first sensor data indicating a statistical distribution of the lengths 310 of the shift travels 210 of the shift shaft 207 during upshift processes effected by the driver of the vehicle 100 is thus possible.

The method 400 furthermore comprises ascertaining 402 second sensor data in relation to the length 310 of the shift travel 210 of the shift shaft 207 of the transmission 104 during at least one downshift process effected by deflection of the shift lever 110 by the driver in a second direction (which is opposite the first direction). In particular, second sensor data can be ascertained for a multiplicity of downshift processes which have in each case been effected by the driver by deflection of the shift lever 110 in the second direction. Ascertainment of second sensor data indicating a statistical distribution of the lengths 310 of the shift travels 210 of the shift shaft 207 during downshift processes effected by the driver of the vehicle 100 is thus possible.

The method 400 furthermore comprises checking 403 the position of the shift lever 110, in particular checking the suitability of the position of the shift lever 110 for the driver, on the basis of the first sensor data and on the basis of the second sensor data. It may be checked for example whether the position allows the driver of the vehicle 100 to carry out both upshift processes and downshift processes in a comfortable manner. For this purpose, it may be checked for example whether the lengths 310 of the shift travels 210 are (on average) sufficiently large for carrying out both upshift processes and downshift processes.

By way of the measures described in the present document, the level of comfort and the level of reliability of shift processes by way of a foot shift lever can be increased.

The present invention is not restricted to the exemplary embodiments shown. In particular, it should be noted that the description and the figures are intended to illustrate only the principle of the proposed methods, apparatuses and systems.

The invention claimed is:

1. A computer-implemented method for checking a position of a shift lever for a transmission of a vehicle, the method comprising:
   ascertaining, with a processor, first sensor data in relation to a length of a shift travel of a shift shaft of the transmission during at least one upshift process effected by deflection of the shift lever by a driver of the vehicle in a first direction;
   ascertaining, with the processor, second sensor data in relation to the length of the shift travel of the shift shaft of the transmission during at least one downshift process effected by deflection of the shift lever by the driver in a second direction;
   checking, with the processor, the position of the shift lever based on the first sensor data and based on the second sensor data; and
   instigating, with the processor, adaptation of the position of the shift lever, according to the first sensor data and the second sensor data, by activation, with the processor, of an actuator of the vehicle, where the actuator is configured to automatically change the position of the shift lever.

2. The computer-implemented method according to claim 1, wherein the act of checking comprises checking a suitability of the position of the shift lever for the driver.

3. The computer-implemented method according to claim 1, wherein the processor instigates adaptation of the position of the shift lever, according to the first sensor data and the second sensor data, further by at least one of:
   output of a piece of information to the driver of the vehicle, or
   entry of a piece of information into an error memory of the vehicle.

4. The computer-implemented method according to claim 1, further comprising:
   ascertaining, with the processor, first sensor data for a multiplicity of upshift processes and second sensor data for a multiplicity of downshift processes;
   ascertaining, with the processor, on the basis of the first sensor data and on the basis of the second sensor data, a statistical evaluation of the length of the shift travel of the shift shaft of the transmission for the multiplicity of upshift processes and for the multiplicity of downshift processes; and checking, with the processor, the position of the shift lever on the basis of the statistical evaluation.

5. The computer-implemented method according to claim 4, further comprising:
ascertaining, with the processor, on the basis of at least one of the first sensor data, a minimum, an average, or a maximum first length of the shift travel for the multiplicity of upshift processes;
ascertaining, with the processor, on the basis of at least one of the second sensor data, a minimum, an average, or a maximum second length of the shift travel for the multiplicity of downshift processes; and
comparing, with the processor, at least one of the minimum, average, or maximum first length of the shift travel with at least one of the minimum, average, or maximum second length of the shift travel in order to check the position of the shift lever.

6. The computer-implemented method according to claim 5, further comprising:
comparing, with the processor, at least one of the minimum, average, or maximum first length of the shift travel with a length threshold value, wherein the length threshold value depends on a length of the shift travel of the shift shaft of the transmission that is a minimum requirement for a successful shift process;
comparing, with the processor, at least one of the minimum, average, or maximum second length of the shift travel with the length threshold value; and
checking, with the processor, the position of the shift lever on the basis of the comparisons.

7. The computer-implemented method according to claim 5, further comprising:
ascertaining, with the processor, a target position of the shift lever for effecting, for a multiplicity of future shift processes at least one of:
a greater degree of symmetry of a frequency distribution ascertained for the multiplicity of future shift processes than a frequency distribution ascertained on the basis of the first sensor data and second sensor data; or
a smaller difference between the average second length and the average first length ascertained for the multiplicity of future shift processes than between the average second length and the average first length ascertained on the basis of the first sensor data and the second sensor data.

8. The computer-implemented method according to claim 1, further comprising:
ascertaining, with the processor, on the basis of the first sensor data and on the basis of the second sensor data, a target position of the shift lever; and
instigating, with the processor, adaptation of the position of the shift lever according to the ascertained target position.

9. The computer-implemented method according to claim 1, wherein:
the shift shaft has a magnet which is configured to rotate together with the shift shaft about an axis of rotation of the shift shaft; and
the ascertaining of the first sensor data and the second sensor data is carried out by a sensor configured to detect sensor data in relation to a magnetic field generated by the magnet.

10. The computer-implemented method according to claim 9, wherein at least one of:
the shift lever is configured to be deflected in the first direction or in the second direction by a foot of the driver of the vehicle; or the shift lever is configured to at least one of convert a deflection of the shift lever in the first direction into a rotation of the shift shaft of the transmission in the first direction, or to convert a deflection of the shift lever in the opposite second direction into a rotation of the shift shaft of the transmission in the opposite second direction, via a linkage.

11. An apparatus for checking a position of a shift lever for a transmission of a vehicle, comprising:
a processor configured to:
ascertain first sensor data in relation to a length of a shift travel of a shift shaft of the transmission during at least one upshift process effected by deflection of the shift lever by a driver of the vehicle in a first direction;
ascertain second sensor data in relation to the length of the shift travel of the shift shaft of the transmission during at least one downshift process effected by deflection of the shift lever by the driver in a second direction; and
check the position of the shift lever based on the first sensor data and based on the second sensor data; and
instigate adaptation of the position of the shift lever, according to the first sensor data and the second sensor data, by activation of an actuator of the vehicle, where the actuator is configured to automatically change the position of the shift lever.

12. The apparatus according to claim 11, wherein the processor of the apparatus is further configured to instigate adaptation of the position of the shift lever, according to the first sensor data and the second sensor data, further by at least one of:
output of a piece of information to the driver of the vehicle, or entry of a piece of information into an error memory of the vehicle.

13. The apparatus according to claim 11, wherein the processor of the apparatus is further configured to:
ascertain the first sensor data for a multiplicity of upshift processes and the second sensor data for a multiplicity of downshift processes;
ascertain, on the basis of the first sensor data and on the basis of the second sensor data, a statistical evaluation of the length of the shift travel of the shift shaft of the transmission for the multiplicity of upshift processes and for the multiplicity of downshift processes; and
check the position of the shift lever on the basis of the statistical evaluation.

14. The apparatus according to claim 13, wherein:
the statistical evaluation is a frequency distribution.

15. The apparatus according to claim 14, wherein the processor of the apparatus is further configured to:
ascertain, on the basis of the first sensor data and on the basis of the second sensor data, a target position of the shift lever; and
instigate adaptation of the position of the shift lever according to the ascertained target position.

16. The apparatus according to claim 15, wherein the processor of the apparatus is configured to ascertain the target position of the shift lever for effecting, for a multiplicity of future shift processes, at least one of:
a greater degree of symmetry of the frequency distribution ascertained for the multiplicity of future shift processes than the frequency distribution ascertained on the basis of the first sensor data and second sensor data; or and/or
a smaller difference between the average second length and the average first length ascertained for the multiplicity of future shift processes than between the average second length and the average first length ascertained on the basis of the first sensor data and the second sensor data.

17. The apparatus according to claim 13, wherein the processor of the apparatus is further configured to:
   ascertain, on the basis of the first sensor data, at least one of a minimum, an average, or a maximum first length of the shift travel for the multiplicity of upshift processes;
   ascertain, on the basis of the second sensor data, at least one of a minimum, an average, or a maximum second length of the shift travel for the multiplicity of downshift processes; and
   compare at least one of the minimum, average, or maximum first length of the shift travel with at least one of the minimum, average, or maximum second length of the shift travel in order to check the position of the shift lever.

18. The apparatus according to claim 17, wherein the processor of the apparatus is further configured to:
   compare at least one of the minimum, average, or maximum first length of the shift travel with a length threshold value, wherein the length threshold value depends on a length of the shift travel of the shift shaft of the transmission that is a minimum requirement for a successful shift process;
   compare at least one of the minimum, average, or maximum second length of the shift travel with the length threshold value; and
   check the position of the shift lever on the basis of the comparisons.

19. The apparatus according to claim 11, wherein the processor of the apparatus is further configured to:
   ascertain, on the basis of the first sensor data and on the basis of the second sensor data, a target position of the shift lever; and
   instigate adaptation of the position of the shift lever according to the ascertained target position.

20. The apparatus according to claim 11, wherein:
   the shift shaft has a magnet which is configured to rotate together with the shift shaft about an axis of rotation of the shift shaft; and
   the means for ascertaining the first sensor data and the second sensor data is a sensor configured to detect sensor data in relation to a magnetic field generated by the magnet.

21. The apparatus according to claim 11, wherein at least one of:
   the shift lever is configured to be deflected in the first direction or in the second direction by a foot of the driver of the vehicle; or
   at least one of the shift lever is configured to convert a deflection of the shift lever in the first direction into a rotation of the shift shaft of the transmission in a first direction, or to convert a deflection of the shift lever in the opposite second direction into a rotation of the shift shaft of the transmission in the opposite second direction, via a linkage.

* * * * *